73-628 SR

OR 3,683,680

[redacted]

...ed State

Johnson et al.

[15] 3,683,680

[45] Aug. 15, 1972

[54] ULTRASONIC FLAW DETECTION APPARATUS

[72] Inventors: Philip Charles Johnson, Theumer; Christoph Rudolf Emil Johnann, Derby, both of England

[73] Assignee: British Railways Board, London, England

[22] Filed: Feb. 3, 1970

[21] Appl. No.: 8,250

[52] U.S. Cl. ....................73/67.7
[51] Int. Cl. ....................G01n 29/04
[58] Field of Search ....................73/67.5, 67.7, 67.8

[56] References Cited

UNITED STATES PATENTS

| | | | |
|---|---|---|---|
| 2,660,054 | 11/1953 | Pringle, Jr. | 73/67.7 |
| 2,846,875 | 8/1958 | Grabendorfer | 73/67.8 |
| 3,299,694 | 1/1967 | Dickenson | 73/67.7 X |

*Primary Examiner*—Richard C. Queisser
*Assistant Examiner*—John P. Beauchamp
*Attorney*—Sommers & Young

[57] ABSTRACT

An ultrasonic flaw detecting arrangement comprising three ultrasonic transducers, a pair of which are spaced apart and constitute transmitters of pulsed ultrasonic energy and the third of which constitutes a receiving transducer, or vice versa, and electronic time delay means or position adjustment means enabling two output signals derived from the use of said pair of transducers as transmitters or receivers and resulting from wave fronts of ultrasonic energy being transmitted into a test piece and reflected from a flaw in the test piece to be made coincident on a common time base means.

5 Claims, 3 Drawing Figures

FIG. 1.
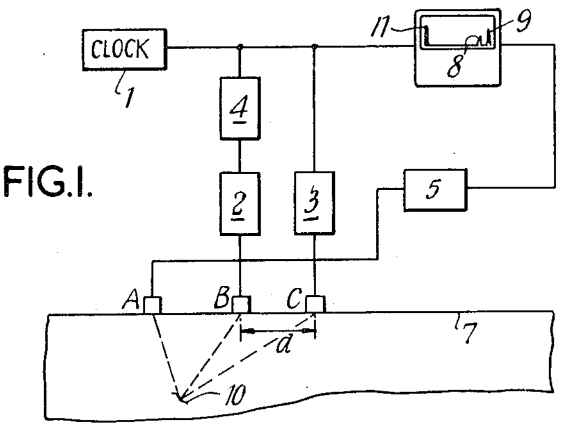
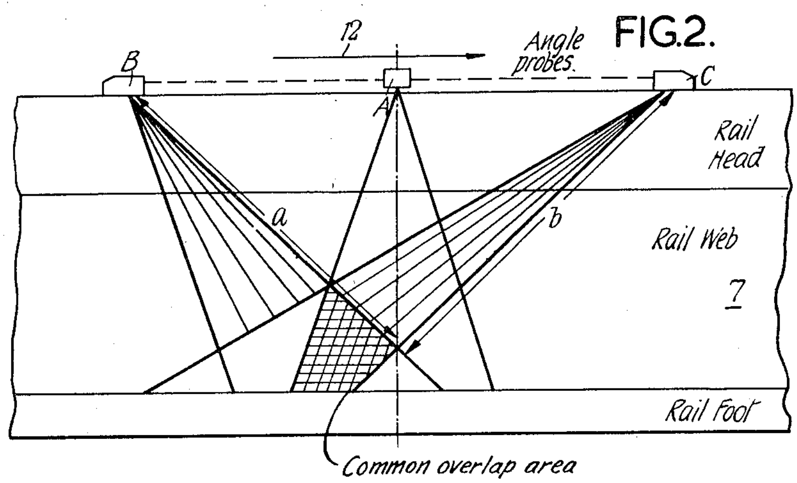
FIG. 2.
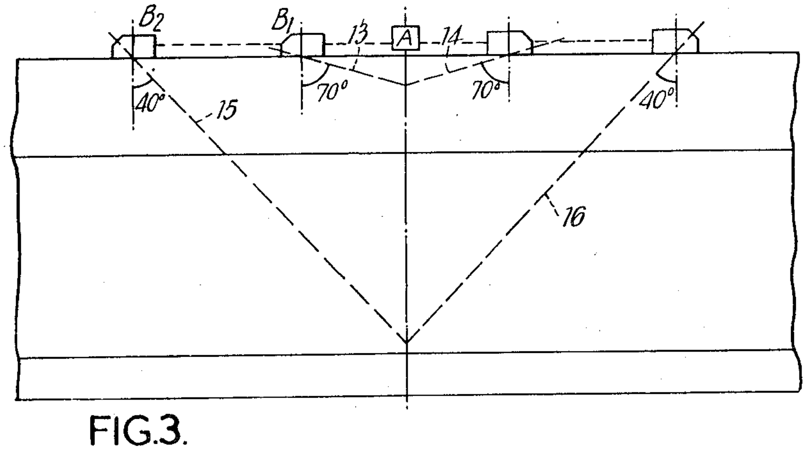
FIG. 3.

ULTRASONIC FLAW DETECTION APPARATUS

This invention relates to ultrasonic flaw detection arrangements and has particular, but not exclusive, application, to the testing of the rails of a railway track.

The internal integrity of a test piece and/or its thickness can be determined by pulsed, ultrasonic energy transmitted into the test piece. Its thickness is determined by the time required for the ultrasonic energy emitted into the test piece from its front surface to reach the rear surface and, being reflected there, return to the front. Similarly, the depth at which a flaw is located in the examined material can be determined by the time required for the ultrasonic energy to reach the flaw and, being reflected at it, return to the front surface to be received as a flaw echo. The returning pulse energy can be reflected, re-radiated, or scattered, or a combination thereof, hereinafter referred to simply as reflected.

Using one known arrangement the ultrasonic energy is transmitted into the test piece in the form of an ultrasonic beam produced at a probe surface which is separated from the surface of the test piece by a coupling medium in the form of a fine film. The probe, when scanning the test piece for internal flaws, is passed over the test piece surface in a given manner. The signals, picked up by the ultrasonic beam of the transducer, are interpreted, thus analyzing the conditions in the inner zones of the test piece. However, unless it were possible to maintain the film thickness constant, the ultrasonic beam is bound to vary in spread and direction as a result of the surface roughness over which the probe is moved during scanning. It is easy to see that signals produced by a beam which is so readily displaced, cannot give an accurate indication of the flaws and their size.

The object of this invention is to provide an ultrasonic flaw detection apparatus which provides a more accurate indication of flaws than the aforesaid known arrangement.

According to the invention, scanning or the search for flaws, is performed by three probes passing over the surface of the test piece and, in contrast to the known arrangement in which the search for flaws was based on beam patterns, location of a flaw is based on the comparison of the path lengths in the material, of the wave fronts of ultrasonic pulses.

Accordingly, the invention provides an ultrasonic flaw detecting arrangement comprising three ultrasonic transducers, a pair of which are spaced a predetermined distance apart and constitute transmitters of pulsed ultrasonic energy and the third of which constitutes a receiving transducer or vice versa, and electronic or physical means enabling two output signals deriving from the use of said pair of transducers as transmitters or receivers and resulting from wave fronts of ultrasonic energy being transmitted into a test piece and reflected from a flaw in the test piece to be made coincident on a common time base means.

Since the physical process involved is reversible, the functions of the transducers employed can be interchanged. Thus the pair of transducers can be used as the receiving or transmitting transducers and the third transducer as a transmitting or receiving transducer.

In order that the invention maybe readily understood, arrangements in accordance therewith will now be described by way of example with reference to the accompanying drawings in which:

FIG. 1 is a block diagram of the first arrangement,

FIG. 2 serves to illustrate a second arrangement, and

FIG. 3 shows a modification of the arrangement of FIG. 2.

Referring to FIG. 1, a master clock 1 is provided and emits trigger pulses at a determined pulse repetition rate into the display cathode ray tube 6 to trigger the time base to produce blip 11 and simultaneously into two pulse transmitters 2 and 3 connected with a pair of probes B, C which thus constitute transmitting transducers for transmitting pulses of ultrasonic energy into a test piece. An infinitely variable time delay 4 is provided between the master clock 1 and transmitter 2 to permit the pulse of ultrasonic energy from probe B to be delayed relatively to that from probe C. The time delay 4 may, for example, be provided with a calibrated dial (not shown) for adjusting the delay time and indicating the amount of delay that it provides for each pulse. The probes B and C are spaced a predetermined distance *d* apart. Probe A constitutes a receiving transducer for the ultrasonic energy reflected from a flaw in the test piece and is arranged at any suitable distance relatively to the probes B and C to provide optimum ultrasonic coupling with probes B and C. The probe A connects electrically with cathode ray tube 6 through amplifier 5.

In use of the above arrangement, the assembly of probes A, B and C is moved along the surface of a test piece 7, for example, a rail of a railway track until a flaw is clearly detected. This will produce two blips 8 and 9 on the time base, spaced apart somewhat as shown, such spacing corresponding to the difference in path lengths of the wave fronts of the two pulses from transducers B and C reflected from the flaw 10 in the test piece.

After such detection of a flaw, the assembly of probes A, B and C is held stationary and the time delay 4 adjusted so that the wave fronts reach the flaw 10 simultaneously. Hence the two output signals from receiver A resulting from the ultrasonic wave fronts transmitted from transducers B and C coincide and blips 8 and 9 also therefore coincide. Such coincidence of the blips 8 and 9 can only occur when the pulse propagation time from transducer B to flaw 10 plus the delay time of variable time delay 4 equals the pulse propagation time from transducer C to flaw 10. With the time delay known, and knowing also, for example, the angle of inclination of the directivity axis of transducer A (which can be arranged to cover only a quite small included angle), the location of flaw 10 can be ascertained quite accurately by triangulation, as will more fully be described in connection with the embodiment of FIG. 2.

By maintaining the probes A, B and C stationary and adjusting time delay 4 as described above, the surface roughness and variation in the thickness of the coupling film cannot affect the measured results.

As an alternative arrangement to that shown in FIG. 1, the two probes B and C could be receiving probes connected through respective amplifiers to the cathode ray tube 6, the probe B having time delay 4 connected between its associated amplifier and the cathode ray tube 6. The probe A would then be the transmitting probe connected to a pulse transmitter such as 2 which in turn is connected to clock 1.

In a further alternative arrangement the probe A may be positioned between probes B and C.

Referring now to FIG. 2 this again shows a probe array arrangement of three probes A, B and C disposed on the surface of a rail of a railway track constituting the test piece 7. The probes A, B and C are physically connected for movement together along the test piece 7, the probes B and C in this example being receiving probes and the probe A a transmitting probe.

In use of the arrangement of FIG. 2 the probes A, B and C are moved in the direction of arrow 12 while searching for a flaw. When a flaw is located, the wave fronts impinging thereon will be re-radiated throughout the rail in a known manner to be picked up by receivers B and C. This will be indicated by two blips such as 9 and 10 (FIG. 1) on a common time-base and the spacing of these two blips will be an indication of the differences in path lengths $a$ and $b$ of the wave fronts reflected from the flaw to the receiving probes B and C. By continued movement of the probes A, B and C in the direction of arrow 12, the path lengths $a$ and $b$ will become equal, path lengths $a$ decreasing and path length $b$ increasing. When this happens, the blips 9 and 10 will coincide and add in amplitude to provide a maximum signal.

As FIG. 2 illustrates, the relatively narrow directivity axes of the two transducers B and C are angled toward each other and toward the centrally positioned transducer A. The transducer A, in turn, has its directivity axis angled downwardly, and consequently there is only a relatively small area which lies within the overlapping directivity axes of the three transducers A, B and C. Consequently, it is only when the flaw lies within this confined area common to the directivity axes of the three transducers that an input signal indicative of a flaw is produced. It is only when the path length from current transducer A, to the flaw, and thence to receiving transducer B is equal to the path length from transducer A, to the flaw, and thence to transducer C, that there will be a superimposition of the flaw signals indicative of the presence of a flaw.

As an alternative arrangement, and as previously suggested, the transducers B and C of FIG. 2 may both be transmitting transducers, and the transducer A may be a receiving transducer.

FIG. 3 shows a modification of the arrangement of FIG. 2. In FIG. 3 each of the receiving probes B and C has been replaced by two different angle receiving probes $B_1$, $B_2$, and $C_1$, $C_2$, the probes $B_1$ and $C_1$ having an optimum receiving direction as indicated by lines 13 and 14 and the probes $B_2$ and $C_2$ having an optimum receiving direction indicated by lines 15 and 16. Thus the array comprising probes A, $B_1$ and $C_1$ forms an arrangement corresponding to FIG. 2 and suited especially for low angle scanning. Similarly the probes A, $B_2$ and $C_2$ form an arrangement corresponding to FIG. 2 but suitable for deep angle scanning. The composite arrangement is suitable for scanning thick test pieces. Conveniently the transmitting probe is a 0° probe the probes $B_1$ and $C_1$ are 70° probes that is to say their optimum receiving direction is 70° to the vertical and the probes $B_2$ and $C_2$ are 40° probes. Thus the probes $B_1$ and $C_1$ will have, for example, maximum response to flaws in the upper two-thirds of the thickness of the test piece and the probes $B_2$ and $C_2$ optimum response to flaws in the lower one-third of the test piece.

An advantage of the array shown in FIG. 3 is that the whole cross-section of the specimen is displayed on one time base setting, and the system is capable of finding flaws in virtually any plane. This property enables a comprehensive ultrasonic scan to be carried out with just one pass instead of repeated tests using individual probes of different angles to cover a section under investigation completely. A further advantage of this array is that it enables the trace to be monitored to enable automatic audible indication of flaws. As a further aid, because of the single time base a half profile of a rail can be drawn on the screen and with the range correctly adjusted, shows flaws in their respective positions.

The arrangement of FIG. 1 could also be modified in the manner of FIG. 3, the time delay means being, for example, between the clock and pulse transmitters for both the transducers $B_1$ and $B_2$.

In a further modification of the arrangement of FIGS. 1 and 2 one of the probes B and C and the probe A are combined into a single transmit/receive probe.

We claim:

1. An ultrasonic flaw detecting arrangement including, a pair of ultrasonic transducers constituting transmitters of pulsed ultrasonic energy, said transducers of said pair being so oriented on the workpiece that the beams of energy transmitted therefrom are angled toward each other so as to impinge upon and be reflected from a flaw in the workpiece, a third transducer constituting a receiver of ultrasonic energy for receiving from both of said transmitters reflections of the pulsed ultrasonic energy reflected from the flaw in the workpiece, means connecting the three transducers in a predetermined spaced relationship and permitting movement of said three transducers over the surface of the workpiece while maintaining said predetermined relationship to vary thereby the path length of the pulsed energy between the flaw and each of the three transducers, whereby movement of said three transducers to a position where the path lengths of the pulsed energy from each said transmitting transducer respectively to the flaw and thence to said receiving transducer are equal so as to result in superimposition of the two reflected signals at said receiving transducer and to provide thereby a flaw-responsive signal having an improved signal-to-noise ratio, and means responsive to said superimposed reflection signals.

2. Ultrasonic flaw detecting apparatus including, a pair of ultrasonic transducers constituting receivers of pulsed ultrasonic energy, a third transducer constituting a transmitter of ultrasonic energy, said transducers of said pair being so oriented on the workpiece that each is responsive to the pulsed ultrasonic energy from said transmitting transducer impinging upon a flaw in the workpiece and reflected therefrom to said receiving transducers, means connecting the three transducers in a predetermined spaced relationship and permitting movement of said three transducers over the surface of the workpiece while maintaining said predetermined relationship to vary thereby the path length of the pulsed energy between the flaw and each of the three transducers, whereby movement of said three transducers to a position where the path length of the pulsed energy from said transmitting transducer to said flaw and thence to a first of said receiving transducers equals the path length from said transmitting transducer to said flaw and thence to the second of said receiving transducers so as to result in concurrent reception of reflections from said flaw by both said receiving transducers, and means responsive to said signals received concurrently by both said receiving transducers to provide thereby a flaw-responsive signal having an improved signal-to-noise ratio.

3. An ultrasonic flaw detecting arrangement including, a pair of ultrasonic transducers constituting transmitters of pulsed ultrasonic energy, a third transducer constituting a receiver of ultrasonic energy for receiving from both of said transmitters reflections of the pulsed ultrasonic energy reflected from a flaw in a test piece, means connecting the three transducers in a predetermined spaced relationship, variable delay time means for delaying the output pulses from one of said transmitters to cause the respective wave fronts of said pair of transmitters to arrive at a flaw simultaneously so that the reflections of said wave fronts received by the receiver are superimposed in additive interference to provide an improved signal-to-noise ratio, and means responsive to the superimposed reflections from said flaw received by said receiver.

4. An ultrasonic flaw detecting arrangement including, a pair of ultrasonic transducers constituting receivers for receiving pulsed ultrasonic energy, a third transducer constituting a transmitter of pulsed ultrasonic energy, means connecting the three transducers in a predetermined spaced relationship, the receivers being arranged to receive reflections of the pulsed ultrasonic energy reflected from a flaw in a test piece, means responsive to the reflection signals received by both said receivers, and variable time delay means for delaying the reflection signal supplied to said responsive means from one said receiver so as to permit superimposition of the reflection signals from said two receivers in additive interference at said responsive means to provide thereby an improved signal-to-noise ratio.

5. The combination of claim 2 which further includes, a second pair of receiving transducers, said transducer of said first pair being placeable on the workpiece symmetrically to either side of said third transducer, said transducers of said second pair being placeable on the workpiece symmetrically to either side of said third transducer and being also spaced outwardly of said transducers of said first pair, said transducers of said first pair having their directivity axes directed toward each other at a large angle to a normal to the surface of the workpiece so as to intersect at a shallow level below the surface of the workpiece, said transducers of said second pair having their directivity axes directed toward each other at a smaller angle to said normal so as to intersect at a deeper level below the surface of the workpiece.

* * * * *